United States Patent [19]

Eitman

[11] Patent Number: 4,735,850
[45] Date of Patent: Apr. 5, 1988

[54] REFRACTORY COMPOSITE ARTICLES

[75] Inventor: David A. Eitman, Huntington Beach, Calif.

[73] Assignee: Science Applications International Corporation, San Diego, Calif.

[21] Appl. No.: 793,706

[22] Filed: Oct. 31, 1985

[51] Int. Cl.$^4$ .................. B32B 5/16; C04B 35/02
[52] U.S. Cl. .................. 428/283; 428/240; 428/297; 428/323; 428/408; 428/903; 501/95; 501/96
[58] Field of Search .............. 501/95, 96; 428/283, 428/408, 403, 323, 297, 240

[56] References Cited

U.S. PATENT DOCUMENTS 3,594,049  7/1971  Turner .................. 308/72
4,397,901  8/1983  Warren .................. 428/101

Primary Examiner—James J. Bell
Attorney, Agent, or Firm—Ellsworth R. Roston; Charles H. Schwartz

[57] ABSTRACT

A porous substrate formed from an agglomeration of fibers preferably has a carbonaceous composition. A binder is applied to the substrate. The binder may illustratively be an acrylic or beeswax to vaporize and form pyrolized carbon during pyrolysis or may illustratively be a phenolic resin, a furfural resin or pitch to form pyrolyzed carbon on the fibers during pyrolysis. A mixture of particles having the same approximate size as the diameter of the fibers is then applied to the fibers to become mechanically locked in the substrate pores. The mixture may contain (a) a first material (preferably a compound containing boron) which oxidizes and melts at a relatively low temperature and is relatively viscous when melted, (b) a second material (preferably a compound containing silicon) which oxidizes and has an increased melting temperature and is more viscous than the first material when melted and (c) a refractory material (preferably a compound containing zirconium) having a considerably higher melting temperature oxide than the first and second materials. The first material may be obtained from group 3a of the periodic table, the second material from group 4a of the periodic table and the third material from groups 4b and 5b of the periodic table. An impermeable coating such as a carbide, oxide or a nitride is thereafter applied to the substrate. The impermeable coating tends to crack at elevated temperatures. The adjacent particles in the mixture melt and flow into the cracks to inhibit crack amplification. The ease of flow is dependent upon the proportions of the first, second and third materials in the mixture. The particles displaced in the mixture from the cracks remain mechanically locked to the substrate.

18 Claims, 1 Drawing Sheet

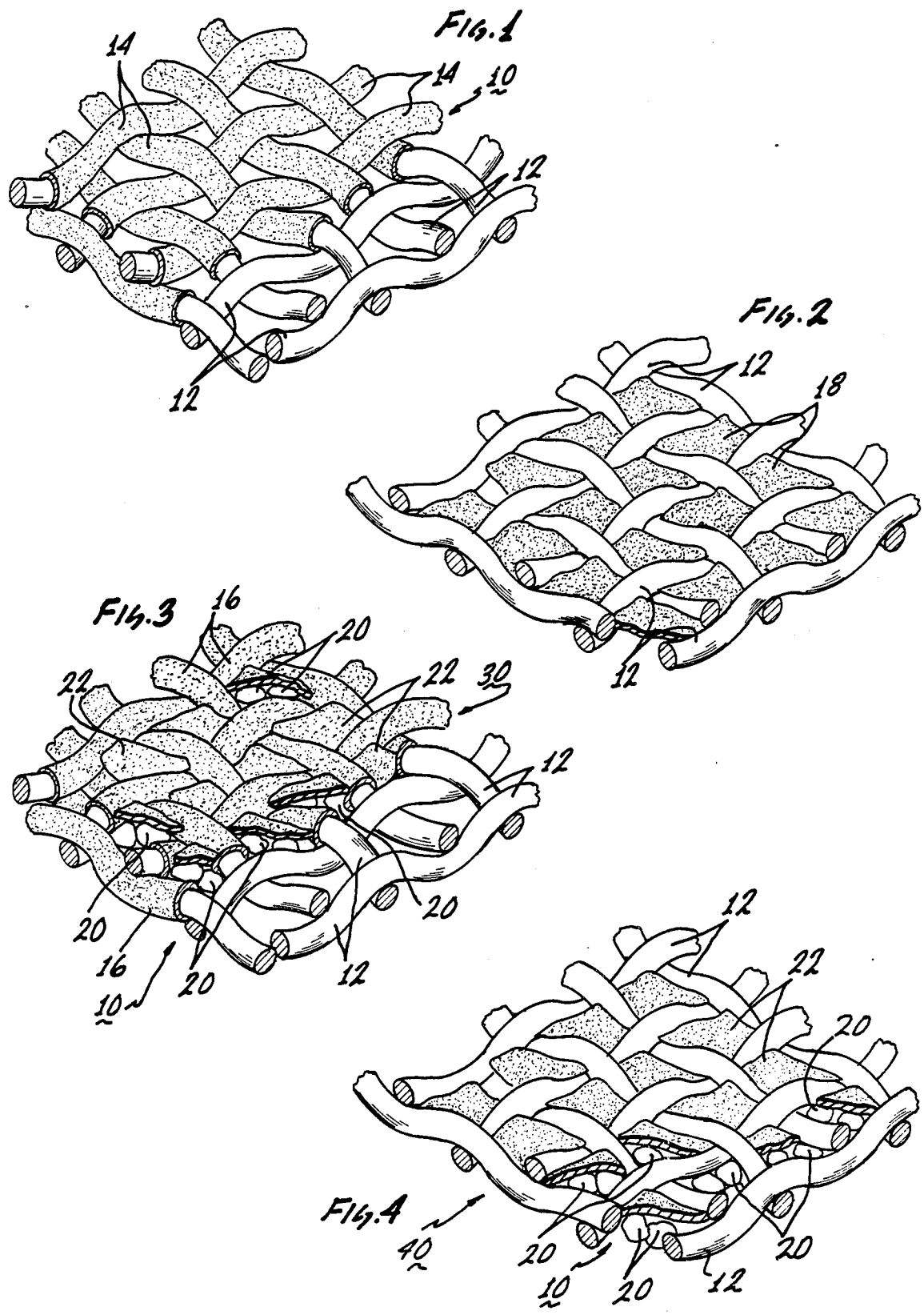

REFRACTORY COMPOSITE ARTICLES

This invention relates to refractory composite articles. More particularly, the invention relates to articles which are made from refractory composite materials and which are capable of operating satisfactorily under severe conditions in ranges of temperatures of thousands of degrees fahrenheit. The invention further relates to methods of producing such articles.

Various needs exist for materials which are capable of operating satisfactorily through elevated ranges of temperatures under severe operating conditions. For example, jet engines now operate at temperatures of several thousands of degrees fahrenheit. The jet engines are expected to operate at these temperatures for extended periods of time without maintenance or overhaul. Rockets operate at even more elevated temperatures than jet engines but their operative life span is considerably shorter than that of jet engines.

Materials are needed in such apparatus as jet engines and rockets for such applications as engine cowlings, engine housings and rocket housings. Such material should be light in weight to increase the payload of the aircraft powered by the jet engines or to increase the thrust of the rockets. The material should also be capable of withstanding corrosion and erosion, particularly since the reaction components of the fuel consumed in the engines or the rockets includes components which corrode or erode many materials. The material should also be hard, tough and wear-resistant, particularly at the elevated temperatures which the material encounters in the jet engines or rockets.

Materials have been developed in the prior art, and are being used, which meet the objectives specified above on a somewhat limited basis. For example, materials have been developed which constitute a carbonaceous, porous substrate and which have layers deposited on the substrate to form a composite material which is somewhat hard, tough, light in weight, corrosion-resistant, erosion-resistant and wear-resistant. However, the material has had only limited success in all of these areas.

In view of the expanding need for such materials, a considerable effort has been made, and a considerable amount of money has been expended, to expand the parameters which refractory composite materials such as those specified above are able to accomplish. Such efforts have had only a limited success. The refractory composite materials capable of being constructed at present do not have the toughness, lightness, temperature range, wear-resistance, corrosion-resistance and erosion-resistance that are desired. This has limited the effectiveness of products such as jet engines and rockets.

This invention provides a material which significantly extends the range of capabilities of refractory composite materials. The material is considerably more tough, hard, wear-resistant, corrosion-resistant and erosion-resistant than the materials of its class in the prior art. The material is also effective in operation through a higher temperature range than the materials of its class in the prior art.

A porous substrate is formed from fibers having a carbonaceous composition and a diameter in the order of seven (7) or eight (8) microns. The fibers occupy approximately 40%-60% of the substrate space. A binder applied to the substrate is cured and then heated to pyrolyze the binder. The binder occupies to 20%-40% of the substrate space. The binder may illustratively be an acrylic or beeswax to vaporize and form pyrolized carbon during pyrolysis or may illustratively be a phenolic resin, a furfural resin or pitch to form pyrolyzed carbon on the fibers during pyrolysis.

A mixture of particles having the same approximate size as the thickness of the fibers is applied to the fibers as a part of the agglomerate to become mechanically locked in the substrate pores. The mixture may contain (a) a first material (preferably a compound containing boron) which oxidizes and melts at a relatively low temperature and is relatively viscous when melted, (b) a second material (preferably a compound containing silicon) which has an oxide with an increased melting temperature and is more viscous than the first material when melted and (c) a refractory material (preferably a compound containing zirconium) having a considerably higher melting temperature as an oxide than the first and second materials. The first material may be obtained from group $3a$ of the periodic table, the second material from group $4a$ of the periodic table, and the third material from groups $4b$ and $5b$ of the periodic table.

An impermeable coating such as a carbide, oxide or a nitride is thereafter applied to the substrate. The impermeable coating tends to crack at elevated temperatures. The adjacent particles in the mixture oxidize and then melt and flow into the cracks to inhibit crack amplification. The ease of flow is dependent upon the proportions of the first, second and third materials in the mixture. The particles displaced in the mixture from the cracks remain mechanically locked to the substrate.

In the drawings:

FIG. 1 is a perspective view schematically illustrating a substrate formed from a plurality of fibers and a binder sheathing the fibers in the substrate;

FIG. 2 is a perspective view schematically illustrating a substrate formed from a plurality of fibers and a binder deposited in the interstices defined by the fibers;

FIG. 3 is a perspective view schematically illustrating one embodiment of an article formed from a refractory composite material included within this invention; and FIG. 4 is a perspective view schematically illustrating a second embodiment of an article formed from a refractory composite material included within this invention.

In one embodiment of the invention, a substrate generally indicated at 10 is provided with porous characteristics. The substrate 10 may be formed from discrete elements such as fibers 12 in a woven or non-woven relationship. When the substrate 10 is non-woven, it may be assembled, braided, knitted or chopped. Preferably the fibers 12 are carbonaceous such as a fabric. For example, the substrate 10 may be formed from pyrolyzed wool, rayon, polyacrylonitride and pitch. The fibers may have a thickness of approximately seven (7) or eight (8) microns. However, the fibers 12 may also be formed from a material having a suitable base such as a ceramic base. Although the use of fibers as the discrete elements is preferred, the discrete elements may also constitute grains or particles or needles.

As will be appreciated, the characteristics of the substrate 10 can be considerably varied without departing from the scope of the invention. For example, when the fibers 12 are used in a woven form, the relative numbers of threads in warp and woof can be varied in great proportions and the spacings between the threads can also be varied considerably.

The substrate 10 may be shaped to any desired configuration. A binder 14 may then be deposited on the fibers 12 in the substrate 10. The binder may then sheath the fibers 12 as illustrated at 15 in FIG. 1. Instead of sheathing the fibers 12, the binder 14 may fill the interstices between the fibers 12, as illustrated at 18 in FIG. 2. The binder positions the fibers 12 in the substrate 10 and strengthens the substrate, at least for handling purposes. The binder may also incorporate particulates in suspension or the particulates may subsequently be added. The binder 14 may then be pyrolyzed to form a layer of pyrolyzed carbon 16 on the fibers of the substrate 10. The layer of pyrolyzed carbon 16 is porous and permeable.

The substrate 10 can be coated with any suitable and conventional type of resin such as phenolic designated by Monsanto Chemical Company as Monsanto 1008 resin to form the binder 14. As a first step, the phenolic may be dissolved in a solvent such that it is fluid. The solvent may illustratively be methylethylketone. The substrate 10 may then be coated with the phenolic and partially polymerized so that it is dry to the touch. Other materials such as a furfural resin or pitch may also be used.

Patterns of the desired shape can then be cut from the substrate 10 or the substrate can be heated to a temperature of at least 160° F., compressed and then cut to the desired shape. The patterns in the desired shape may then be placed in a mold and heated to a suitable temperature such as approximately 350° F. to cure the phenolic. The patterns may then be cured at a temperature above 350° F. to stabilize the system.

The phenolic is then pyrolyzed at a temperature of approximately 1600° F. to decompose it to carbon, its elemental form. One reason for the pyrolysis is to prevent the substrate from thereafter emitting gases when it is heated. However, the discrete elements 12 are retained in position by the pyrolyzed carbon 16 which may be disposed in the interstices between the discrete elements or which may sheath the fibers, as shown in FIG. 3.

When the binder constituting the phenolic is pyrolyzed as discussed in the previous paragraph, it loses approximately half of its mass and it shrinks and cracks. In spite of this, the pyrolyzed carbon is able to hold the discrete elements 12 in position in the substrate and to impart strength to the substrate. The substrate 10 is then heated to a temperature of approximately 2200° F. to 4100° F. for a relatively short period of time to impart a final shrink and pyrolyzation to the binder.

To provide the pyrolyzed carbon 16 on the substrate 10, the substrate may also be disposed in a furnace of conventional design. The temperature of the substrate may then be raised to a suitable temperature such as approximately 1800° F., and a vacuum in the order of 15 mm mercury (hg) may be maintained within the deposition chamber. Pyrolyzed carbon may then be deposited about each of the fibers 12 in the substrate 10 as by flowing methane gas through the porous substrate for an extended period of time such as about fifty (50) hours.

Instead of using a wet binder or a gas to coat the discrete elements 12, a dry binder may be used. Dow Corning Polycarbosilane 6-2330 material is illustrative. This is a dry resin which may be mixed with methylethylketone to provide a fluid mixture with which to work. This material has properties of becoming partially polymerized at room temperatures. The material is mixed with the substrate and is then heated to a temperature of approximately 1600° F. to pyrolyze the binder. The material is subsequently heated to a temperature of 2200° F. to 4100° F. to provide it with a final pyrolyzation and shrink.

Sodium silicate or colloidal alumina can also be used as binders. The substrate 10 may be dipped into sodium silicate in liquid form and may then be heated. The sodium silicate flows along the lengths of the discrete elements 10 and tends to congregate or agglomerate at the interstices between the discrete elements. The formation of layers of material at the interstices between the fibers of the substrate 10 is shown in FIG. 2.

The pyrolyzed carbon 16 facilitates the promotion of a good load transfer between the fibers 12, particularly when an article from the refractory composite material of this invention is stressed. The pyrolyzed carbon 16 also helps to strengthen and stabilize the substrate 10, particularly when the article is subjected to stress. It also enhances the mechanical interface for increasing the surface fracture energy of the composite structure defining an article generally indicated at 21 and formed from the refractory composite material of this invention. As a result, the pyrolyzed carbon 14 enhances the toughness and flow resistance of the refractory composite article 21.

Instead of applying a material on the substrate 10 to retain pyrolyzed carbon on the substrate after pyrolyzation, a material may be applied to the substrate to vaporize during pyrolysis. The function of this material is to retain the substrate as a composite material in a desired shape as the substrate and the binder are cured. Such a binder may constitute an acrylic or beeswax.

A mixture of particles 20 is then applied to the substrate 10 or has previously been incorporated into the binder. Preferably the particles have a size in the same order of magnitude as the diameter of the fibers 12 in the substrate 10. For example, the particles 20 in the mixture may have a size of at least five (5) microns when the fibers 12 have a thickness of approximately seven (7) or eight (8) microns. By providing particles of this size, the particles become mechanically locked in the pores of the substrate 10. This mechanical locking tends to strengthen the composite material which is produced.

Instead of being defined by particles, the mixture can be defined by needles or a mixture of needles and particles. When needles are provided, the mechanical locking of the mixture to the substrate is enhanced. However, as used throughout the specification and in the claims, the term "particles" is intended to include needles and other forms of discrete elements.

The particles 20 can be applied to the pores of the substrate 10 separately after the pyrolysis of the binder or in combination with the application of the binder 14. The particles 20 can even be applied to the pores of the substrate 10 before the application of the binder to the substrate. Preferably the particles 20 are applied to the substrate 10 either after, or in conjunction with, the application of the binder to the substrate and the pyrolysis of the binder.

The mixture of the particles 20 is preferably formed from a combination of different materials. Preferably the mixture contains compounds of boron, silicon and a refractory material such as zirconium. The boron may be in the form of a boride such as zirconium boride ($ZrB_2$) or boron carbide ($B_4C$). The silicon may be in the form of a silicide or may be in some other form such as silicon carbide. The zirconium may be in the form of zirconium boride ($ZrB_2$) or in any other suitable form.

Other materials may be substituted for boron in the mixture of the particles 20. For example, other elements in group 3a of the periodic table may be substituted for boron. Similarly, other elements in group 4a of the periodic table may be substituted for silicon. Other elements in groups 4b and 5b of the periodic table may be substituted for zirconium as a refractory material in the mixture. These include niobium, hafnium, tantalum and titanium.

The relative percentages of the different materials in the mixture of the particles 20 are dependent upon the use which is to be made of the composite material constituting this invention. For example, when the composite material is used to sheath a jet engine, it may be subjected to temperatures as high as 4000° F. and may be expected to withstand such temperatures for long periods of time while maintaining its properties for such long periods of time. In contrast, the composite material may be used in rockets or missiles. In such applications, the composite material may be subjected to temperatures as high as 5500° F. Under such conditions, the composite material may not have to maintain its properties for extended periods of time.

For applications at temperatures to approximately 2500° F., the mixture of particles may have the following range of compositions:

| Material Containing | Relative Amount By Volume |
|---|---|
| Boron | 65 to 95 |
| Silicon | 1 to 21 |
| Refractory Material | 1 to 21 |

Preferably the mixture of the particles 20 has the following composition for applications at temperatures to approximately 2500° F.:

| Material Containing | Relative Amount By Volume |
|---|---|
| Boron | 80 |
| Silicon | 11 |
| Refractory Material | 11 |

When the composite material is to be used at temperatures above approximately 2500° F., the mixture of the particles 20 may have the following range of compositions:

| Material Containing | Relative Amount By Volume |
|---|---|
| Boron | 55 to 85 |
| Silicon | 5 to 25 |
| Refractory Material | 7 to 27 |

Preferably the mixture of the particles 20 has the following composition when the compsoite material is to be used at temperatures above approximately 2500° F.:

| Material Containing | Relative Amount By Volume |
|---|---|
| Boron | 70 |
| Silicon | 15 |

| Material Containing | Relative Amount By Volume |
|---|---|
| Refractory Material | 17 |

An impervious coating 22 may be deposited on the substrate as by chemical vapor deposition. The impervious coating 22 may be formed from a carbide such as silicon carbide, titanium carbide or hafnium carbide or may be formed from a nitride such as silicon nitride. However, other materials may be used. The impervious coating inhibits the fibers 12 in the substrate 10 from becoming oxidized by the atmosphere. Oxidation of the fibers 12 in the substrate 10 is undesirable because it tends to weaken the substrate.

The fibers 12 may occupy approximately forty percent (40%) to sixty percent (60%) of the space defined by the substrate 10. The binder 14 can occupy to approximately forty percent (40%) of the space defined by the substrate 10. Preferably the binder occupies twenty five percent (25%) or less of the space defined by the substrate 10. The mixture of the particles 20 can occupy all or any portion of the remaining space in the substrate 10.

To form the composite material constituting this invention, the binder 14 can be applied to a fabric which is woven or non-woven and defines the substrate 10. This may be provided by any of the methods discussed above or by dipping the fabric into a liquid constituting the binder. Any excess of binder can then be removed by rolling such excess binder from the fabric. The application of a desired amount of the binder to the substrate 10 can also be controlled by regulating the fluidity or viscosity of the binder. During the above application, the particles may be suspended in the liquid constituting the binder to permit coapplication of binder and particles to the fabric.

The fabric defining the substrate 10 may thereafter be disposed in a fixture and the substrate may be subjected to pressure and heated to cure the binder. When the binder is cured, it becomes a solid and holds in place the fabric defining the substrate 10. The magnitudes of the heat and the pressure applied to the substrate 10 are dependent upon the binder being used. For example, when the binder constitutes pitch, the substrate 10 may be heated to a temperature of approximately 850° F. The substrate 10 may be heated to a temperature of approximately 350° F. when the binder is a phenolic resin. When the binder 14 is an acrylic, the substrate 10 may be heated to a melting temperature well known for such acrylics and may then be cooled to a temperature of approximately 150° F. to prevent the binder from becoming loose.

After the binder 14 has been applied to the fibers 12 defining the substrate 10, the substrate is made dense by the application of pressure. The binder 14 may be then decomposed or pyrolyzed by heating the substrate 14 to a temperature in the range of 1000° F. to 5000° F. The particular temperature is dependent upon the specific binder being used and upon the application to be made of the refractory composite material constituting this invention. One of the reasons for decomposing the binder as by the application of heat is that the binder is not thermally stable, particularly at the elevated temperatures at which the refractory composite material is to be operated. Thus, the binder will tend to decompose at temperatures at, or below, the range of temperatures in which the refractory composite material may be operated. The decomposition of the binder during the use of the refractory composite material is undesirable because it may specifically reduce the life of the refractory composite material and the operating characteristics of the material during such shortened life. For example, the decomposition of the binder may tend to decrease the strength and hardness of the refractory composite material.

Another binder is preferably applied to the substrate 10 after the binder previously applied to the binder has been decomposed or pyrolyzed. This binder is applied in any suitable manner such as by chemical vapor deposition or in a liquid form. This binder may also be pyrolyzed or decomposed in a manner similar to that described above. The sequential application of the binder and the subsequent pyrolyzation of the binder through more than one cycle are desirable because the interstices between the fiber 12 tend to become filled by the pyrolyzed material.

The mixture of the particles 20 has then become locked mechanically in the pores of the fibers. The disposition of the particles 20 in mechanically locked relationship with the substrate 10 is advantageous because it increases the strength of the refractory composite material which is produced. This results in part from the fact that the fibers 12 are inhibited by the particles 20 from shearing even when large shearing forces are applied to the refractory composite material. As a final step, an impermeable coating 22 is applied to the substrate 10 as by chemical vapor deposition, physical vapor deposition or particle spray (plasma or flume).

FIG. 3 illustrates an article generally indicated at 30 and constituting one embodiment formed from the refractory composite material of this invention. The article 30 includes the pyrolyzed carbon 16. FIG. 4 illustrates an article generally indicated at 40 and constituting another embodiment formed from the refractory composite material of this invention. The article 40 does not include the pyrolyzed carbon 16.

When the refractory composite material of this invention is used in an application such as a jet engine or a rocket, the impervious layer 22 tends to crack microscopically. This may be considered to be undesirable since it tends to expose the substrate 10 to the atmosphere. As a result, the substrate 10 and the pyrolyzed carbon 16 tend to oxidize. The oxidation is accelerated because the refractory composite material is operating at elevated temperatures. As the substrate 10 and the pyrolyzed carbon 16 oxidize, they tend to vaporize. This causes the impervious layer 22 to continue to crack microscopically. If anything, the formation of the microscopic cracks in the impervious layer 22 is accelerated at the elevated temperatures.

At the elevated temperatures, the boron in the mixture of the particles 20 tends to oxidize to boron oxide and the boron oxide melts and flows. Boron oxide is relatively non-viscous so that it flows relatively easily. The boron oxide tends to flow to the microscopic cracks in the impervious layer 22 and to seal the cracks. This inhibits any oxidation of the substrate 10 and the pyrolyzed carbon 16.

The silicon in the mixture of the particles 20 also tends to oxidize to silicon dioxide at the elevated temperatures. The silicon dioxide tends to flow when it melts. The flow of the silicon dioxide also occurs toward the microscopic cracks in the impervious layer 22 to fill the cracks and inhibit oxidation of the substrate 10. However, silicon dioxide is more viscous than boron oxide. Furthermore, the melting temperature of silicon dioxide is higher than that of boron oxide. As a result, the silicon dioxide in the mixture tends to control the rate at which the boron oxide flows. Thus, by controlling the relative percentages of the silicon and boron in the mixture of the particles 20, the effective temperature of the mixture in sealing the microscopic cracks in the impervious layer 22 can also be controlled.

The refractory material such as zirconium oxidizes at elevated temperatures in excess of 3000° F., mixes with the silicon dioxide and boron oxide and melts at these elevated temperatures. Zirconium oxide is quite viscous. Thus, the refractory material such as zirconium tends to regulate the rate at which the mixture in the particles 20 can melt and flow into the microscopic cracks in the impervious layer 22.

The particles 20 tend to melt only at the surface of the substrate 10. As a result, the particles 20 continue to provide a mechanical bonding with the substrate in the remaining area of the substrate. Furthermore, as the refractory composite material of this invention cools after operation of the article in which it is incorporated, the microscopic cracks in the impervious layer tend to decrease in size. This causes some of the oxides produced from the mixture in the particles 20 to flow from the microscopic cracks into voids in the body of the substrate. As a result, although the melted oxides fill the microscopic cracks in the impervious layer 22, they allow the microscopic cracks to breathe so that the cracks can decrease in size as the temperature decreases.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:
1. In a refractory composite material,
a substrate formed from a plurality of fibers of a carbonaceous material, the fibers being disposed in a porous non-woven relationship,
pyrolyzed carbon material disposed on the fibers of the substrate, and
particles of a mixutre of a boride, a silicon compound and a refractory material mechanically locked in the pores of the substrate.

2. In the refractory composite material set forth in claim 1,
an impervious coating disposed on the substrate.

3. In the combination set forth in claim 1,
the boride having a volume range in the mixture of approximately sixty five (65) parts to ninety five (95) parts, the silicide having a volume range in the mixture of approximately one (1) part to twenty one (21) parts and the refractory component having a volume range in the mixture of approximately one (1) part to twenty one (21) parts.

4. In the combination as set forth in claim 1,
the boride having a volume range in the mixture of approximately fifty five (55) parts to eighty five parts, the silicide having a volume range in the mixture of five (5) parts to twenty five (25) parts and the refractory component having a volume range in the mixture of approximately seven (7) parts to twenty seven (27) parts.

5. In combination for operation at a particular temperature,
a substrate formed from a plurality of fibers defining a porous relationship, the fibers having a particular diameter in the micron range, and a plurality of particles having a thickness in the order of the fiber diameter and disposed in the pores of the substrate in mechanically locked relationship with the fibers defining the substrate, the particles including a first relatively non-viscous material having properties of oxidizing and melting at temperatures considerably less than the particular temperature and further including a refractory material having properties of oxidizing and having an oxide melting temperature greater than the melting temperature of the oxide of the first material, the refractory material being relatively viscous.

6. In a combination as set forth in claim 5,
the particles including a third material having properties of oxidizing and having an oxide melting temperature higher than the melting temperature of the oxide of the first material and lower than the oxide melting temperature of the refractory material, the viscosity of the oxide of the third material being greater than that of the oxide of the first material and less than that of the oxide of the second material.

7. In a combination as set forth in claim 6,
a pyrolyzed carbon covering the fibers.

8. In a combination as set forth in claim 5, an impervious material covering the substrate.

9. In a combination as set forth in claim 8, the fibers being made from a carbonaceous material.

10. In combination,
a porous substrate formed from a plurality of fibers having a porous relationship, the fibers having a particular thickness,
pyrolyzed particles disposed on the fibers defining the porous substrate, and
a mixture of particles mechanically locked in the porous substrate, the mechanically locked particles being formed from a mixture of the following:
(a) a material selected from group 3a of the periodic table,
(b) a material selected from group 4a of the periodic table, and
(c) a refractory material selected from groups 4b and 5b of the periodic table.

11. In a combination as set forth in claim 10,
the material selected from group 3a of the periodic table having a percentage greater than fifty percent (50%) by volume in the mixture.

12. In a combination as set forth in claim 10,
an impervious layer covering the porous substrate.

13. In a combination as set forth in claims 11, an impermeable layer covering the porous substrate, the impermeable layer being formed from a material selected from the group consisting of the carbides and nitrides of silicon, titanium and hafnium.

14. In combination for operation at elevated temperatures,
a substrate defined by fibers disposed in a porous relationship to define a porous substrate, the fibers occupying approximately forty percent (40%) to sixty percent (60%) of the space defined by the substrate,
pyrolytic carbon disposed on the fibers and occupying to approximately twenty five percent (25%) of the space defined by the substrate, and
a mixture of particles occupying at least a portion of the remaining space defined by the substrate, the mixture of particles having approximately the same dimensions as the diameter of the fibers, the mixture of particles including a first material having properties of oxidizing and having a relatively low oxide melting temperature, a second material having properties of oxidizing and having an increased oxide melting temperature and a refractory material having properties of oxidizing and having an oxide with an oxide melting temperature considerably above the melting temperatures of the first and second oxide materials, the particles in the mixture being mechanically locked in the pores in the substrate, the oxide of the first material being non-viscous, the oxide of the second material being more viscous than the oxide of the first material and the oxide of the third material being considerably more viscous than the oxides of the first and second materials.

15. In a combination as set forth in claim 14,
an impermeable layer coating the substrate, the impermeable layer having properties of producing microscopic cracks at the elevated temperatures and the mixture having properties of melting at temperatures below such elevated temperature and of flowing into such cracks.

16. In a combination as set forth in claim 14,
the particles in the mixture having a size in the order of the diameter of the fibers and the fibers having a diameter in the micron range.

17. In a combination as set forth in claim 15,
the fibers having a diameter in the order of seven (7) to eight microns ($8\mu$) and the particles in the mixture having a size in the order of five microns ($5\mu$).

18. In a combination as set forth in claim 17 wherein the fibers are carbonaceous and the first material in the mixture is selected from group 3a of the periodic table, the second material is obtained from group 4a of the periodic table and the refractory material is selected from groups 4b and 5b of the periodic table.

* * * * *